United States Patent
Zhou et al.

(10) Patent No.: US 12,388,074 B2
(45) Date of Patent: Aug. 12, 2025

(54) POSITIVE ELECTRODE PLATE, AND ELECTROCHEMICAL APPARATUS AND ELECTRONIC APPARATUS INCLUDING SUCH POSITIVE ELECTRODE PLATE

(71) Applicant: Ningde Amperex Technology Limited, Ningde (CN)

(72) Inventors: Hua Zhou, Ningde (CN); Lei Li, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 643 days.

(21) Appl. No.: 17/709,528

(22) Filed: Mar. 31, 2022

(65) Prior Publication Data

US 2022/0223836 A1  Jul. 14, 2022

Related U.S. Application Data

(63) Continuation of application No. PCT/CN2020/081853, filed on Mar. 27, 2020.

(51) Int. Cl.
*H01M 4/131* (2010.01)
*H01M 4/02* (2006.01)
(Continued)

(52) U.S. Cl.
CPC ........... *H01M 4/131* (2013.01); *H01M 4/136* (2013.01); *H01M 4/505* (2013.01);
(Continued)

(58) Field of Classification Search
CPC ...... H01M 4/131; H01M 4/136; H01M 4/505; H01M 4/5805; H01M 4/622; H01M 4/625;
(Continued)

(56) References Cited

U.S. PATENT DOCUMENTS

| 10,693,181 | B2 | 6/2020 | Lin et al. |
| 11,322,774 | B2 | 5/2022 | Lin et al. |

(Continued)

FOREIGN PATENT DOCUMENTS

| CN | 104241696 A | 12/2014 |
| CN | 105074967 A | 11/2015 |

(Continued)

OTHER PUBLICATIONS

International Search Report mailed on Dec. 29, 2020, received for PCT Application PCT/CN2020/081853, filed on Mar. 27, 2020, 7 pages including English Translation.

(Continued)

*Primary Examiner* — Allison Bourke
*Assistant Examiner* — Robert Gene West
(74) *Attorney, Agent, or Firm* — XSENSUS LLP

(57) ABSTRACT

A positive electrode plate includes a composite current collector, a functional coating, and a positive electrode active material layer, where the functional coating is disposed on at least one surface of the composite current collector, and is located between the composite current collector and the positive electrode active material layer; and the functional coating comprises a positive electrode active material, and a D50 particle size of the positive electrode active material is less than or equal to 5 μm. This can reduce the stress applied to the composite current collector during a cold pressing process without losing energy density. In addition, this also can mitigate misalignment of a metal layer and a polymer film due to inconsistent stretching extents, and alleviate problems such as cracking of the metal layer of the composite current collector and the metal layer tending to fall off from the polymer film.

16 Claims, 1 Drawing Sheet

(51) Int. Cl.
  *H01M 4/136* (2010.01)
  *H01M 4/505* (2010.01)
  *H01M 4/58* (2010.01)
  *H01M 4/62* (2006.01)
  *H01M 4/66* (2006.01)
  *H01M 10/0525* (2010.01)

(52) U.S. Cl.
  CPC ......... *H01M 4/5805* (2013.01); *H01M 4/622* (2013.01); *H01M 4/625* (2013.01); *H01M 4/661* (2013.01); *H01M 4/667* (2013.01); *H01M 10/0525* (2013.01); *H01M 2004/021* (2013.01); *H01M 2004/028* (2013.01); *H01M 2220/30* (2013.01)

(58) Field of Classification Search
  CPC .. H01M 4/661; H01M 4/667; H01M 10/0525; H01M 2004/021; H01M 2004/028; H01M 2220/30
  USPC .......................................................... 429/11
  See application file for complete search history.

(56) References Cited

U.S. PATENT DOCUMENTS

| | | | |
|---|---|---|---|
| 11,664,528 B2 | 5/2023 | Lin et al. | |
| 11,777,103 B2 | 10/2023 | Li et al. | |
| 12,015,118 B2 | 6/2024 | Lin et al. | |
| 2002/0028380 A1* | 3/2002 | Tanjo | H01M 10/0568 429/231.1 |
| 2010/0119940 A1 | 5/2010 | Okano et al. | |
| 2016/0013480 A1* | 1/2016 | Sikha | H01M 4/043 427/126.6 |
| 2017/0331115 A1 | 11/2017 | Saito et al. | |
| 2019/0067691 A1* | 2/2019 | Tamura | H01M 4/525 |
| 2019/0267664 A1 | 8/2019 | Lin et al. | |
| 2019/0372109 A1* | 12/2019 | Moon | H01M 4/1391 |
| 2020/0266483 A1 | 8/2020 | Lin et al. | |
| 2021/0013515 A1* | 1/2021 | Shao | H01M 4/685 |
| 2021/0151772 A1 | 5/2021 | Li et al. | |
| 2022/0223902 A1 | 7/2022 | Lin et al. | |
| 2022/0223903 A1 | 7/2022 | Lin et al. | |
| 2024/0297339 A1 | 9/2024 | Lin et al. | |

FOREIGN PATENT DOCUMENTS

| | | | |
|---|---|---|---|
| CN | 107078303 A | 8/2017 | |
| CN | 108281662 A | 7/2018 | |
| CN | 109004170 A | 12/2018 | |
| CN | 109301160 A | 2/2019 | |
| CN | 110661003 A | 1/2020 | |

OTHER PUBLICATIONS

Office Action mailed Apr. 24, 2022, in Chinese Application No. 202080036796.X, 11 pages including English Translation.
Office Action mailed Sep. 28, 2022, in Chinese Application No. 202080036796.X, 11 pages including English Translation.
Decision of Refusal mailed Jan. 20, 2023, in Chinese Application No. 202080036796.X, 8 pages including English Translation.
Reexamination notification mailed Nov. 16, 2023, in Chinese Application No. 202080036796.X, 8 pages including English Translation.
Reexamination Decision mailed Feb. 6, 2024, in Chinese Application No. 202080036796.X, 18 pages including English Translation.
Supplementary European Search Report mailed Oct. 27, 2022, in European Application No. 20927573.4, 8 pages.

* cited by examiner

POSITIVE ELECTRODE PLATE, AND ELECTROCHEMICAL APPARATUS AND ELECTRONIC APPARATUS INCLUDING SUCH POSITIVE ELECTRODE PLATE

CROSS REFERENCE TO THE RELATED APPLICATIONS

This application is a Continuation of International Patent Application PCT/CN2020/081853 filed on Mar. 27, 2020, the entire content of which is incorporated herein by reference.

TECHNICAL FIELD

This application relates to the technical field of lithium-ion batteries, and specifically, to a positive electrode plate, and an electrochemical apparatus and an electronic apparatus including such positive electrode plate.

BACKGROUND

Lithium-ion batteries are increasingly entering people's lives, especially in consumer electronics, smart furniture and other fields, thanks to advantages such as high voltage plateau, long cycle life, low self-discharge, and being environment friendly and pollution-free.

With widespread application of lithium-ion batteries, consumers are also having increasing requirements for performance of lithium batteries, focusing on energy density and safety.

In the prior art, to improve safety and energy density of lithium-ion batteries, a composite metal layer is disposed on both sides of a polymer to form a composite current collector. The composite current collector can prevent lithium-ion batteries from catching fire and explosion due to internal short circuit when encountering abnormal conditions such as collision, squeezing, and puncture. Compared with metal foil current collectors, such composite structure can also reduce weight of the current collector and increase energy density of the lithium-ion battery. However, due to a low elastic modulus (4 Gpa to 6 Gpa) of the polymer film of the composite current collector, an electrode plate stretches greatly during a cold pressing process, so that the metal layer tends to crack, which deteriorates electrical conductivity of the composite current collector and weakens adhesion between the metal layer and the polymer film.

SUMMARY

This application is proposed to address the above problem, and is intended to provide a positive electrode plate, and an electrochemical apparatus and an electronic apparatus including such positive electrode plate, so as to reduce stretching of the positive electrode plate during a cold pressing process, alleviate a problem of metal layer cracking in a composite current collector, and improve electrical conductivity of the positive electrode plate.

A first aspect of this application provides a positive electrode plate, including a composite current collector, a functional coating, and a positive electrode active material layer. The composite current collector includes a polymer film, and a metal layer that is respectively disposed on two surfaces of the polymer film. The functional coating is disposed on at least one surface of the composite current collector, and is located between the composite current collector and the positive electrode active material layer.

The functional coating comprises a positive electrode active material, and a D50 particle size of the positive electrode active material is less than or equal to 5 μm. In addition, the D50 particle size of the positive electrode active material in the positive electrode active material layer is in the range of 10 μm≤D50≤20 μm.

In some implementations of the first aspect of this application, the positive electrode active material in the functional coating is at least one selected from the group consisting of NCM523, lithium iron phosphate, lithium cobalt oxide, lithium manganate, and lithium iron manganese phosphate.

In some implementations of the first aspect of this application, a thickness of the functional coating ranges from 3 μm to 12 μm.

In some implementations of the first aspect of this application, the functional coating further contains a conductive agent, and the conductive agent is at least one selected from the group consisting of conductive carbon black (SP), carbon nanotube (CNT), carbon nanofiber (CNF), and graphene.

In some implementations of the first aspect of this application, the functional coating further contains a binder, and the binder is at least one selected from the group consisting of styrene butadiene rubber, polyvinylidene fluoride, polytetrafluoroethylene, epoxy resin, polyvinyl alcohol, polyimide, polyamideimide, polyacrylamide, and polyacrylic acid.

In some implementations of the first aspect of this application, by weight percentage, the functional coating comprises:
  positive electrode active material is 80 wt % to 97 wt %;
  binder is 2 wt % to 10 wt %; and
  conductive agent is 1 wt % to 10 wt %.

In some implementations of the first aspect of this application, an elongation rate of the positive electrode plate is less than 1.5%.

In some implementations of the first aspect of this application, a sheet resistance of the composite current collector is less than 50.0 mohm/sq.

A second aspect of this application further provides an electrochemical apparatus, including the positive electrode plate according to any implementation of the first aspect of this application.

A third aspect of this application provides an electronic apparatus, including the electrochemical apparatus provided according to the second aspect of this application.

With the positive electrode plate provided in this application, because the functional coating is disposed, and the functional coating contains small-particle positive electrode active material, stress applied to the composite current collector during the cold pressing process can be reduced without losing energy density. In addition, particles of the small-particle positive electrode active material are embedded into the composite current collector at a relatively shallow depth, which can effectively reduce elongation rate of the positive electrode plate after the cold pressing, thereby mitigating misalignment of a metal layer and a polymer film due to inconsistent stretching extents, and alleviating problems such as cracking of the metal layer of the composite current collector and the metal layer tending to fall off from the polymer film.

Furthermore, with the positive electrode plate provided in this application, an electrochemical apparatus and an electronic apparatus with optimized performance can be obtained.

The terms used in this application are generally those commonly used by those skilled in the art. If they are inconsistent with the commonly used terms, the terms in this application shall prevail.

In this specification, the term "D50" means a particle size of a material at 50% in the volume-based particle size distribution measured by a laser particle size tester.

BRIEF DESCRIPTION OF DRAWINGS

To describe the technical solutions in the embodiments of this application and in the prior art more clearly, the following briefly describes the accompanying drawings required for the embodiments and the prior art. Apparently, the accompanying drawings in the following description show merely some of the embodiments of this application, and a person of ordinary skill in the art may still derive other drawings from these accompanying drawings without creative efforts.

REFERENCE SIGNS composite current collector: 10;
metal layer: 101;
polymer film: 102;
functional coating: 20;
positive electrode active material layer: 30.

DETAILED DESCRIPTION

To make the objectives, technical solutions, and advantages of this application more comprehensible, the following describes this application in detail with reference to accompanying drawings and embodiments. Apparently, the described embodiments are merely some but not all of the embodiments of this application. All other embodiments obtained by a person skilled in the art based on the embodiments of this application without creative efforts shall fall within the protection scope of this application.

Figure 1:
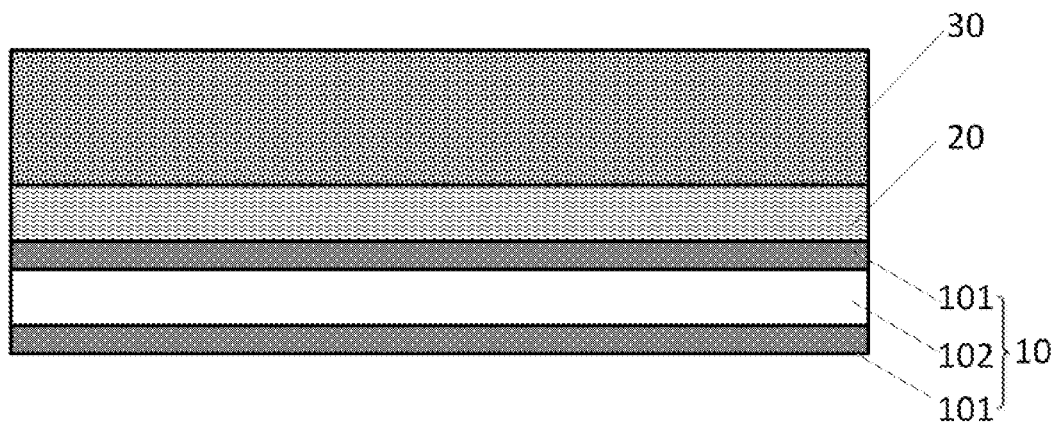
FIG. 1 is a schematic structural diagram of a positive electrode plate according to this application.
Figure 2:
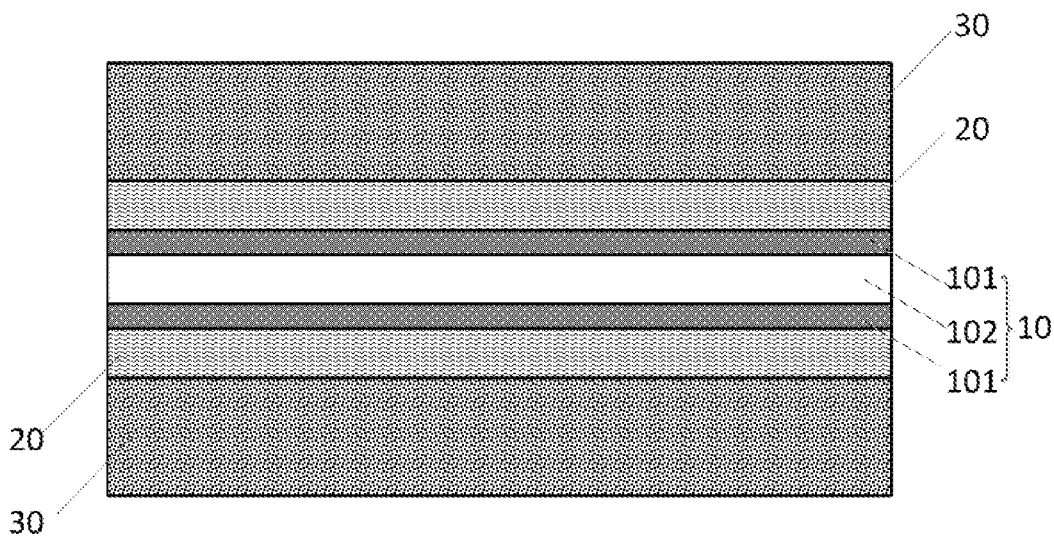
FIG. 2 is a schematic structural diagram of another positive electrode plate according to this application.

As shown in FIG. 1 and FIG. 2, a first aspect of this application provides a positive electrode plate, including a composite current collector 10, a functional coating 20, and a positive electrode active material layer 30. The composite current collector 10 includes a polymer film 102, and a metal layer 101 that is respectively disposed on two surfaces of the polymer film 102. The functional coating 20 is disposed on at least one surface of the composite current collector 10, and is located between the composite current collector 10 and the positive electrode active material layer 30.

The functional coating 20 comprises a positive electrode active material, and a D50 particle size of the positive electrode active material is less than or equal to 5 µm. In addition, the D50 particle size of the positive electrode active material in the positive electrode active material layer 30 is in the range of 10 µm≤D50≤20 µm.

As shown in FIG. 1, the functional coating 20 is disposed on one surface of the composite current collector 10.

As shown in FIG. 2, the functional coating 20 is disposed on two surfaces of the composite current collector 10.

In this application, the metal layer 101 of the composite current collector 10 is not particularly limited. For example, any metal layer commonly known to those skilled in the art can be used. For example, a metal layer made of iron, copper, aluminum, nickel, stainless steel, titanium, tantalum, gold, or platinum can be used. One type of these materials may be used alone, or two or more types may be used in combination at any ratio. In the composite current collector of the positive electrode, aluminum or copper-aluminum alloy is particularly preferred as the metal layer.

In this application, the polymer film 102 of the composite current collector 10 is not particularly limited, and any polymer film commonly known to those skilled in the art can be used. For example, the polymer film contains a high molecular polymer, where the high molecular polymer includes at least one of polyethylene, polypropylene, polyethylene terephthalate, nylon, polytetrafluoroethylene, and fluorocarbon resin.

Preferably, the polymer film 102 may also contain a conductive material. For example, the conductive material includes at least one of graphite powder, super conductive carbon black, carbon nanotubes, and carbon nanofiber.

After in-depth research, the inventors have found that when the functional coating 20 is disposed between the composite current collector 10 and the positive electrode active material layer 30, because the functional coating 20 comprises a small-particle positive electrode active material, stress applied to the composite current collector 10 during a cold pressing process can be reduced without losing energy density. In addition, particles of the small-particle positive electrode active material are embedded into the composite current collector 10 at a relatively shallow depth, which can effectively reduce elongation rate of the electrode plate after the cold pressing, thereby mitigating misalignment of the metal layer 101 and the polymer film 102 due to inconsistent stretching extents, and alleviating problems such as cracking of the metal layer of the composite current collector and the metal layer tending to fall off from the polymer film.

In some implementations of the first aspect of this application, the positive electrode active material in the functional coating 20 is at least one selected from the group consisting of NCM523, lithium iron phosphate, lithium cobalt oxide, lithium manganate, and lithium iron manganese phosphate.

The positive electrode active material used in this application may be prepared according to the prior art or obtained through commercial channels.

The inventors have found that the positive electrode plate prepared by using the above specific positive electrode active material within a specific range of D50 particle size has better performance, especially in the elongation and sheet resistance of the cold-pressed positive electrode plate.

Without being limited to any theory, the inventors believe that using the above specific positive electrode active material can retain the battery capacity, and can also minimize damage caused by larger particles of the positive electrode active material in the positive electrode active material layer 30 to the metal layer 101 of the composite current collector 10 during the cold pressing process, thereby reducing elongation rate of the cold-pressed electrode plate.

If the functional coating 20 is not disposed, the positive electrode active material with larger particle size in the positive electrode active material layer 30 are in direct contact with the composite current collector 10. During the cold pressing, large particles of the positive electrode active material are easily embedded into the metal layer 101 of the composite current collector 10, resulting in cracking of the metal layer 101. In addition, in the composite current collector 10, an elastic modulus of the polymer film 102 is low, and an elastic modulus of the metal layer 101 is high. The metal layer 101 and the polymer film 102 stretch to different extents during cold pressing, and are misaligned, further causing cracking of the metal layer 101, weakening adhesion between the metal layer 101 and the polymer film 102, and eventually resulting in stratification of the composite current collector 10 in the battery, increased internal resistance of the battery, and deteriorated cycling performance. If the functional coating 20 is disposed and a specific active material within the above specific range of D50 particle size is used, material particles of the coating are small, and during a cold pressing process, the active material of the coating is embedded into the metal layer 101 of the composite current collector 10 at a shallow depth, and the electrode plate stretches to a small extent, which can relieve stress caused by cold pressing, and alleviate the problem of cracking of the metal layer 101.

In this application, the positive electrode active material in the positive electrode active material layer 30 may be selected from a positive electrode active material commonly used in the art, which is not limited in this application.

In some implementations of the first aspect of this application, a thickness of the functional coating 20 ranges from 3 μm to 12 μm, and preferably from 3 μm to 9 μm. A thicker functional coating 20 has a more obvious effect on reducing the elongation rate of the electrode plate. However, an excessively large thickness may decrease energy density of the battery.

In some implementations of the first aspect of this application, the functional coating 20 further contains a conductive agent, and the conductive agent is at least one selected from the group consisting of conductive carbon black (SP), carbon nanotube (CNT), carbon nanofiber (CNF), and graphene.

The inventors have found through research that the above specific conductive agent has a better effect on reducing the elongation rate of the cold-pressed electrode plate and alleviating stress on the composite current collector 10 during the cold pressing process.

In some implementations of the first aspect of this application, the functional coating 20 further contains a binder, and the binder is at least one selected from the group consisting of styrene butadiene rubber, polyvinylidene fluoride, polytetrafluoroethylene, epoxy resin, polyvinyl alcohol, polyimide, polyamideimide, polyacrylamide, and polyacrylic acid. The binder is used to bond particles in the functional coating 20 together, and bond the functional coating 20 to the composite current collector 10.

In some implementations of the first aspect of this application, by weight percentage, the functional coating 20 comprises:
positive electrode active material is 80 wt % to 97 wt %;
binder is 2 wt % to 10 wt %; and
conductive agent is 1 wt % to 10 wt %.

Within the above range, the functions of the functional coating 20 can be effectively ensured, the elongation rate of the composite current collector 10 during cold pressing can be reduced, and the battery capacity is not affected.

In this application, the preparation method of the functional coating 20 is not limited. For example, it may be the gravure coating method, the transfer coating method, the extrusion coating method, the PVD method, or the like.

In some implementations of the first aspect of this application, an elongation rate of the positive electrode plate is less than 1.5%.

In some implementations of the first aspect of this application, a sheet resistance of the composite current collector 10 is less than 50.0 mohm/sq.

In this application, the sheet resistance of the composite current collector 10 being less than 50.0 mohm/sq means sheet resistance of the composite current collector 10 with the functional coating 20 and the positive electrode active material layer 30 removed after cold pressing. A higher elongation rate of the electrode plate leads to a more severe cracking of the metal layer of the composite current collector and a greater sheet resistance of the composite current collector.

A second aspect of this application further provides an electrochemical apparatus, including the positive electrode plate according to any implementation of the first aspect of this application.

The electrochemical apparatus in this application includes, but is not limited to, a secondary battery or a super capacitor.

The electrochemical apparatus in this application may include a positive electrode plate, a negative electrode plate, a separator, and an electrolyte.

For example, the secondary battery includes a lithium-ion secondary battery and a lithium-polymer battery. The electrochemical apparatus being a lithium-ion battery is used as an example for description.

In the lithium-ion battery, the positive electrode plate includes a positive electrode current collector and a positive electrode active material layer. In this application, the positive electrode active material layer comprises a positive electrode active material that can absorb and release lithium (Li). For example, the positive electrode active material may include at least one of lithium cobaltate, lithium nickel cobalt manganate, lithium nickel cobalt aluminate, lithium manganate, lithium nickelate, lithium manganese iron phosphate, lithium vanadium phosphate, lithium vanadyl phosphate, lithium iron phosphate, and lithium-manganese-containing base material.

For example, in the foregoing positive electrode active material, the chemical formula of lithium cobalt oxide may be $Li_xCo_aM1_bO_{2-c}$, where M1 is selected from a group including nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), and a combination thereof, and values of x, a, b, and c are in the following ranges: $0.8 \leq x \leq 1.2$, $0.8 \leq a \leq 1$, $0 \leq b \leq 0.2$, and $-0.1 \leq c \leq 0.2$.

In the lithium-ion battery, the negative electrode plate includes a negative electrode current collector and a negative electrode active material layer, where the negative electrode active material layer contains negative electrode active material. In this application, the negative electrode active material is not particularly limited. For example, the negative electrode active material may include at least one of graphite, silicon, silicon carbon, and the like.

The lithium-ion battery also includes an electrolyte, and the electrolyte may be in one or more of the following states: gel state, solid state, and liquid state. The liquid electrolyte includes a lithium salt and a non-aqueous solvent.

The lithium salt is at least one selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, and $LiPO_2F_2$. For example, $LiPF_6$ may be selected as the lithium salt.

The non-aqueous solvent may be at least one selected from the group consisting of a carbonate compound, a carboxylate compound, an ether compound, a nitrile compound, and other organic solvents.

The carbonate compound may be at least one selected from the group consisting of diethyl carbonate (DEC), dimethyl carbonate (DMC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, and trifluoromethylethylene carbonate.

In the electrochemical apparatus of this application, a separator may also be disposed between the positive electrode and the negative electrode to prevent short circuit. A material and shape of the separator used in the electrochemical apparatus according to this application is not particularly limited, and may be based on any technology disclosed in the prior art. For example, the separator includes a polymer or an inorganic material formed by a material stable to the electrolyte of this application.

For example, the separator may include a substrate layer and a surface treatment layer. The substrate layer may be a non-woven fabric, membrane, or composite membrane having a porous structure, and a material of the substrate layer may be at least one selected from the group consisting of polyethylene, polypropylene, polyethylene terephthalate, and polyimide. Specifically, a polypropylene porous film, a polyethylene porous film, polypropylene non-woven fabric, polyethylene non-woven fabric, or a polypropylene-polyethylene-polypropylene porous composite film may be selected. A surface treatment layer is disposed on at least one surface of the substrate layer, and the surface treatment layer may be a polymer layer or an inorganic material layer, or may be a layer formed by a mixture of a polymer and an inorganic material.

For example, the inorganic material layer includes inorganic particles and a binder. The inorganic particles are at least one selected from the group consisting of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene. The polymer layer includes a polymer, and a material of the polymer includes at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

Those skilled in the art should understand that the foregoing descriptions of this application are merely examples, and are not intended to limit this application.

The positive electrode plate used in the electrochemical apparatus in this application is selected from the positive electrode plate provided by any one of the technical solutions according to the first aspect of this application, and the negative electrode plate may be selected from a negative electrode plate commonly known in the art.

The negative electrode plate commonly known in the art may be a negative electrode plate that includes a negative electrode current collector and a negative electrode active material layer.

This application further provides an electronic apparatus, including the electrochemical apparatus provided in this application.

In this application, the electronic apparatus may be any electronic apparatus, such as a mobile phone, a notebook computer, a video camera, a digital camera, and an electric toy.

This application is specifically described based on examples below, but this application is not limited to these examples.

Test on Particle Size

Mastersizer 2000 laser particle size distribution tester was used to analyze a particle size of a sample. The sample was dispersed in 100 mL of dispersant (N-methylpyrrolidone), so that shading degree ranges from 8% to 12%. Subsequently, the sample was subjected to ultrasonic treatment for 5 minutes at an ultrasonic intensity of 40 kHz and 180 W. After the ultrasonic treatment, the sample was analyzed for laser particle size distribution to obtain particle size distribution data.

Test on Elongation of Electrode Plate

Before cold pressing, 1 m of the positive electrode plate was taken, and two endpoints of that part of positive electrode plate were marked. After cold pressing, distance between the two endpoints of the positive electrode plate was recorded as D, and elongation rate is equal to (D−1)/1*100%.

Test on Sheet Resistance

The positive electrode plate was cold-pressed, the cold-pressed positive electrode plate was taken, and the functional coating and positive electrode active material layer were cleaned to obtain the composite current collector. The FT-332 common four-probe sheet resistance resistivity tester was used to measure the sheet resistance of the composite current collector, and the value was recorded.

The test results of the elongation rate of the electrode plate and the sheet resistance are shown in Table 1.

Example 1

The composite current collector used in this example was a composite current collector with a composite aluminum metal layer on two surfaces of the polymer film, where thickness of the polymer film was 5 μm and thickness of the aluminum metal layer was 1 μm.

Lithium iron phosphate, conductive carbon black (SuperP), and polyvinylidene fluoride were mixed at a weight ratio of 96:1:3, and then NMP was added as a dispersion medium and mixed, to obtain a functional coating slurry with a solid content of 60%. Then, the functional coating slurry was applied on the composite current collector, and then the composite current collector was dried at 110° C. to obtain a 3 μm-thick functional coating after drying. The D50 particle size of lithium iron phosphate was 2 μm.

$LiCoO_2$ (LCO), polyvinylidene fluoride (PVDF), and conductive carbon black (SP) were mixed at a weight ratio of 97:1.6:1.4, and then NMP was added as a dispersion medium and mixed, to obtain a positive electrode slurry with a solid content of 60%. The positive electrode slurry was applied on the functional coating. The functional coating was dried at 110° C., and then roll-pressed using a roller machine, to obtain a positive electrode plate with a 100

μm-thick positive electrode active material layer. The D50 particle size of LiCoO$_2$ (LCO) was 15 μm.

Example 2

Example 2 was the same as Example 1 except that the thickness of the functional coating was 5 μm.

Example 3

Example 3 was the same as Example 1 except that the thickness of the functional coating was 8 μm.

Example 4

Example 4 was the same as Example 1 except that in the functional coating, lithium iron phosphate was replaced with NCM523 (D50 was 2 μm).

Example 5

Example 5 was the same as Example 4 except that the thickness of the functional coating was 5 μm.

Example 6

Example 6 was the same as Example 4 except that the thickness of the functional coating was 8 μm.

Example 7

Example 7 was the same as Example 1 except that in the functional coating, D50 of lithium iron phosphate was 5 μm, and that the thickness of the functional coating was 5 μm.

Example 8

Example 8 was the same as Example 1 except that in the functional coating, lithium iron phosphate was replaced with NCM523 whose D50 was 5 μm, and that the thickness of the functional coating was 5 μm.

Example 9

Example 9 was the same as Example 7 except that in preparing the functional coating, the ratio of lithium iron phosphate, conductive carbon black (SuperP), and polyvinylidene fluoride was adjusted to 80:5:15.

Example 10

Example 10 was the same as Example 7 except that in preparing the functional coating, the ratio of lithium iron phosphate, conductive carbon black (SuperP), and polyvinylidene fluoride was adjusted to 88:3:9.

Example 11

Example 11 was the same as Example 1 except that in preparing the positive electrode slurry, the D50 particle size of LiCoO$_2$ (LCO) was 10 μm.

Example 12

Example 12 was the same as Example 1 except that in preparing the positive electrode slurry, the D50 particle size of LiCoO$_2$ (LCO) was 20 μm.

Example 13

Example 13 was the same as Example 1 except that the thickness of the functional coating was 2 μm.

Example 14

Example 14 was the same as Example 1 except that the thickness of the functional coating was 10 μm.

Example 15

Example 15 was the same as Example 1 except that in the functional coating, the ratio of lithium iron phosphate, conductive carbon black (SuperP), polyvinylidene fluoride was adjusted to 75:10:15, and that the thickness of the functional coating was 5 μm.

Comparative Example 1

LiCoO$_2$ (LCO), polyvinylidene fluoride (PVDF), and conductive carbon black (SP) were mixed at a weight ratio of 97:1.6:1.4, and then NMP was added as a dispersion medium and mixed, to obtain a positive electrode slurry with a solid content of 60%. The positive electrode slurry was applied on the same composite current collector as Example 1. The composite current collector was dried at 110° C., and then roll-pressed using a roller machine to obtain a positive electrode plate with a 100 μm-thick positive electrode active material layer.

Comparative Example 2

Comparative Example 2 was the same as Example 1 except that in the functional coating, D50 of lithium iron phosphate was 6 μm, and that the thickness of the functional coating was 5 μm.

TABLE 1

| Example | Type and particle size of positive electrode active material in functional coating | Percentage of positive electrode active material in functional coating (by weight) | Thickness of functional coating | Particle size of positive electrode active material in positive electrode active material layer (D50) | Elongation rate (%) | Sheet resistance (mohm/sq) |
|---|---|---|---|---|---|---|
| Example 1 | lithium iron phosphate (D50 2 μm) | 96% | 3 μm | 15 μm | 1.44 | 49.6 |
| Example 2 | lithium iron phosphate (D50 2 μm) | 96% | 5 μm | 15 μm | 1.31 | 45.3 |

TABLE 1-continued

| Example | Type and particle size of positive electrode active material in functional coating | Percentage of positive electrode active material in functional coating (by weight) | Thickness of functional coating | Particle size of positive electrode active material in positive electrode active material layer (D50) | Elongation rate (%) | Sheet resistance (mohm/sq) |
|---|---|---|---|---|---|---|
| Example 3 | lithium iron phosphate (D50 2 μm) | 96% | 8 μm | 15 μm | 1.13 | 40.5 |
| Example 4 | NCM523 (D50 2 μm) | 96% | 3 μm | 15 μm | 1.48 | 49.8 |
| Example 5 | NCM523 (D50 2 μm) | 96% | 5 μm | 15 μm | 1.34 | 45.5 |
| Example 6 | NCM523 (D50 2 μm) | 96% | 8 μm | 15 μm | 1.16 | 40.8 |
| Example 7 | lithium iron phosphate (D50 5 μm) | 96% | 5 μm | 15 μm | 1.40 | 47.7 |
| Example 8 | NCM523 (D50 5 μm) | 96% | 5 μm | 15 μm | 1.39 | 47.6 |
| Example 9 | lithium iron phosphate (D50 2 μm) | 80% | 5 μm | 15 μm | 1.30 | 45.5 |
| Example 10 | lithium iron phosphate (D50 2 μm) | 88% | 5 μm | 15 μm | 1.32 | 45.4 |
| Example 11 | lithium iron phosphate (D50 2 μm) | 96% | 5 μm | 10 μm | 1.41 | 49.4 |
| Example 12 | lithium iron phosphate (D50 2 μm) | 96% | 5 μm | 20 μm | 1.45 | 49.9 |
| Example 13 | lithium iron phosphate (D50 2 μm) | 96% | 2 μm | 15 μm | 1.68 | 54.3 |
| Example 14 | lithium iron phosphate (D50 2 μm) | 96% | 10 μm | 15 μm | 1.32 | 45.5 |
| Example 15 | lithium iron phosphate (D50 2 μm) | 75% | 5 μm | 15 μm | 1.58 | 52.4 |
| Comparative Example 1 | Non | NA | NA | 15 μm | 2.00 | 60.2 |
| Comparative Example 2 | lithium iron phosphate (D50 6 μm) | 96% | 5 μm | 15 μm | 1.98 | 59.6 |

Through comparison between Examples 1 to 15 and Comparative Examples 1 to 2, it can be learned that after the functional coating was disposed, both the elongation rate and sheet resistance of the positive electrode plate decreased significantly.

It can be learned from Comparative Example 2 that when the particle size of the active material in the functional coating exceeded the particle size limit defined in this application, D50≤5 μm, the elongation rate and sheet resistance of the positive electrode plate were slightly lower than those in a case in which no functional coating was disposed. However, the elongation rate and square resistance were significantly lower than those in the examples of this application.

It can be learned that the positive electrode plate provided in this application can effectively reduce stress on the composite current collector during cold pressing, and solve a technical problem that the positive electrode active material is embedded into the composite current collector and the conductivity is reduced.

The foregoing descriptions are merely preferable embodiments of this application, but are not intended to limit this application. Any modification, equivalent replacement, or improvement made without departing from the principle of this application shall fall within the protection scope of this application.

What is claimed is:

1. A positive electrode plate, comprising: a composite current collector, a functional coating and a positive electrode active material layer; wherein the composite current collector comprises a polymer film and a metal layer disposed on two surfaces of the polymer film;
    the functional coating is disposed on at least one surface of the composite current collector and is located between the composite current collector and the positive electrode active material layer;
    the functional coating comprises a first positive electrode active material, and a D50 particle size of the first positive electrode active material is less than or equal to 5 μm;
    the positive electrode active material layer comprises a second positive electrode active material, a D50 particle size of the second positive electrode active material is in a range of 10 μm≤D50≤20 μm;
    a thickness of the functional coating ranges from 3 μm to 12 μm; and by weight percentage, in the functional coating, the first positive electrode active material is 80 wt % to 97 wt %.

2. The positive electrode plate according to claim 1, wherein the first positive electrode active material is at least one selected from the group consisting of NCM523, lithium iron phosphate, lithium manganate, and lithium iron manganese phosphate.

3. The positive electrode plate according to claim 1, wherein the functional coating further comprises a conductive agent, and the conductive agent is at least one selected from a group consisting of conductive carbon black, carbon nanotubes, carbon nanofiber and graphene.

4. The positive electrode plate according to claim 3, wherein the functional coating further comprises a binder, and the binder is at least one selected from a group consisting of styrene butadiene rubber, polyvinylidene fluoride, polytetrafluoroethylene, epoxy resin, polyvinyl alcohol, polyimide, polyamideimide, polyacrylamide and polyacrylic acid.

5. The positive electrode plate according to claim 4, wherein by weight percentage, in the functional coating,
the binder is 2 wt % to 10 wt %; and
the conductive agent is 1 wt % to 10 wt %.

6. The positive electrode plate according to claim 1, wherein an elongation rate of the positive electrode plate is less than 1.5%.

7. The positive electrode plate according to claim 1, wherein a sheet resistance of the composite current collector is less than 50.0 mohm/sq.

8. An electrochemical apparatus, comprising: a positive electrode plate; the positive electrode plate comprises a composite current collector, a functional coating and a positive electrode active material layer; wherein the composite current collector comprises a polymer film and a metal layer disposed on two surfaces of the polymer film;
the functional coating is disposed on at least one surface of the composite current collector and is located between the composite current collector and the positive electrode active material layer;
the functional coating comprises a first positive electrode active material, and a D50 particle size of the first positive electrode active material is less than or equal to 5 μm;
the positive electrode active material layer comprises a second positive electrode active material, a D50 particle size of the second positive electrode active material is in a range of 10 μm≤D50≤20 μm;
a thickness of the functional coating ranges from 3 μm to 12 μm; and
by weight percentage, in the functional coating, the first positive electrode active material is 80 wt % to 97 wt %.

9. The electrochemical apparatus according to claim 8, wherein the first positive electrode active material is at least one selected from a group consisting of NCM523, lithium iron phosphate, lithium manganate, and lithium iron manganese phosphate.

10. The electrochemical apparatus according to claim 8, wherein the functional coating further comprises a conductive agent, and the conductive agent is at least one selected from a group consisting of conductive carbon black, carbon nanotubes, carbon nanofiber, and graphene.

11. The electrochemical apparatus according to claim 10, wherein the functional coating further comprises a binder, and the binder is at least one selected from a group consisting of styrene butadiene rubber, polyvinylidene fluoride, polytetrafluoroethylene, epoxy resin, polyvinyl alcohol, polyimide, polyamideimide, polyacrylamide, and polyacrylic acid.

12. The electrochemical apparatus according to claim 11, wherein by weight percentage, in the functional coating,
the binder is 2 wt % to 10 wt %; and
the conductive agent is 1 wt % to 10 wt %.

13. The electrochemical apparatus according to claim 8, wherein an elongation rate of the positive electrode plate is less than 1.5%.

14. An electronic apparatus, comprising an electrochemical apparatus, the electrochemical apparatus comprises a positive electrode plate, the positive electrode plate comprises a composite current collector, a functional coating and a positive electrode active material layer; wherein the composite current collector comprises a polymer film and a metal layer disposed on two surfaces of the polymer film;
the functional coating is disposed on at least one surface of the composite current collector and is located between the composite current collector and the positive electrode active material layer;
the functional coating comprises a first positive electrode active material, and a D50 particle size of the first positive electrode active material is less than or equal to 5 μm;
the positive electrode active material layer comprises a second positive electrode active material, a D50 particle size of the second positive electrode active material is in a range of 10 μm≤D50≤20 μm;
a thickness of the functional coating ranges from 3 μm to 12 μm; and
by weight percentage, in the functional coating, the first positive electrode active material is 80 wt % to 97 wt %.

15. The positive electrode plate according to claim 1, wherein the D50 particle size of the first positive electrode active material is less than or equal to 2 μm.

16. The positive electrode plate according to claim 1, wherein the D50 particle size of the second positive electrode active material in the positive electrode active material layer is in the range of 15 μm≤D50≤20 μm.

\* \* \* \* \*